United States Patent Office 2,829,721
Patented Apr. 8, 1958

2,829,721

DIRECTIONAL CONTROL SYSTEM FOR ROTARY WING AIRCRAFT HAVING CONTRA-ROTATING LOAD-CARRYING ROTORS

David F. Gebhard, Nixon, N. J., assignor to Gyrodyne Company of America, Inc., St. James, N. Y., a corporation of New York Application October 27, 1954, Serial No. 464,938

10 Claims. (Cl. 170—135.24)

The present invention relates to a directional control system for rotary wing aircraft having two load-carrying rotors turning in opposite directions. The invention is particularly applicable to helicopters having coaxial rotors one above the other, tandem rotors disposed one ahead of the other and rotors arranged side by side. While, for clarity of description, reference is herein made to rotary wing aircraft having "two" rotors, it will be understood that the invention is also applicable to aircraft having more than two rotors, the term "two" being used in the sense of "at least two."

As a load-carrying rotor of a helicopter turns in the air, the blades or wings of the rotor provide lift and also develop drag. The drag is composed of, "profile drag," i. e. drag resulting from the frictional resistance of the blade passing through the air, and "induced drag," i. e. drag resulting from a rearward component of the lift. The combined drag of the rotor blades reacts through the rotor shaft as torque opposing the torque by which the rotor is driven. In a helicopter having a single load-carrying rotor, the reaction torque is counterbalanced by a small rotor having an approximately horizontal axis, for example a tail rotor. In a helicopter having contra-rotating load-carrying rotors, the reaction torque of one rotor is balanced by that of the other so that no tail rotor is necessary.

It has previously been proposed to provide directional control for a helicopter with contra-rotating load-carrying rotors by varying the pitch of the blades of the rotors. If the pitch of the blades of one rotor is increased and the pitch of the other rotor is decreased, the reaction torque of the first rotor is increased while that of the second rotor is decreased. This produces a torque differential that reacts through the rotor transmission and power unit and appears as a torque tending to turn the fuselage of the aircraft about the approximately vertical axis of the rotor shafts. It is thus possible, by differential control of rotor blade pitch, to control the directional heading of a helicopter.

The above-described method of steering a helicopter has been found reasonably satisfactory in "power-on" flights, i. e. when the rotors are being driven by the engine. It has been found, however, that in low-power, or "power-off" flight, e. g. in making a descent with a dead engine, the directional control becomes very "soft" or may reverse itself. Hence with the same position of the rudder pedals, or other directional control member, the helicopter may turn in one direction in power-on flight and in the opposite direction in power-off flight. This reversal of controls is disconcerting to a pilot and gives rise to an accident hazard. Moreover, the marked softening of the directional control in power-off or low-power flight presents a serious problem in helicopters with contra-rotating load-carrying rotors.

An object of the improved directional control system in accordance with the present invention is to provide positive control both in power-on and power-off flight, so that the pilot has full control of the aircraft at all times.

A further object of the invention is to avoid reversal of the direction of control in going from power-on to power-off flight, and vice versa. With the control system in accordance with the invention, "right rudder" will turn the aircraft to the right and "left rudder" will turn the aircraft to the left, regardless of whether it is in power-on or power-off flight. For convenience of terminology, rudder pedals, a rudder bar, or a wheel controlling the direction of the aircraft are herein sometimes referred to as a "pilot-controlled steering member."

Other objects and advantages of the invention will be more fully understood from the following description and claims in conjunction with the accompanying drawings, in which:

Fig. 10 comprising two sheets designated Fig. 10A

In accordance with the present invention, directional control of a rotary wing aircraft having contra-rotating load carrying rotors is obtained by means of spoilers on the rotor blades. The term "spoiler" is defined as a small plate arranged to project above, below, or out from the surface of a wing to disturb the smooth air flow, with consequent loss of lift and increase of drag. The spoilers are movable between an "active" position, in which they project out from the rotor blades and increase their drag while decreasing their lift, and an "inactive" position, in which they lie within, or substantially conform to, the airfoil contour of the blades.

In Figs. 1 to 8 of the drawings, there is shown by way of example a directional control system in accordance with the invention embodied in a helicopter having co-axial rotors. The helicopter has a fuselage or frame 1 (Fig. 1) and a rotor head 2 comprising an upper rotor 3 and a lower rotor 4, each having a plurality of rotor blades or wings 5. The two rotors are driven in opposite directions, as indicated by the arrows in Fig. 1, by a power plant shown as an engine 6 through a transmission 7 that includes a free-wheeling device or clutch permitting the rotors to rotate by auto-rotation in the event the engine stops or runs at a speed lower than that corresponding to the rotor speed. The fuselage is provided with a pilot seat 8.

The rotor blades 5 on each rotor are mounted on a rotor hub 10 by means of bearings 11 and 12 (Fig. 2) which permit the blades to turn about a longitudinal axis so as to change the pitch of the blades. The hubs 10 in turn are pivotally mounted, respectively, on upper and lower shafts 13 and 14 by means of hinge pins 15 which permit limited see-saw rocking of the rotors about axes approximately perpendicular to the rotor shafts and to the longitudinal axes of the rotor blades. Each of the rotor blades has a horn 16 by means of which the pitch of the blade is controlled.

Figure 1:
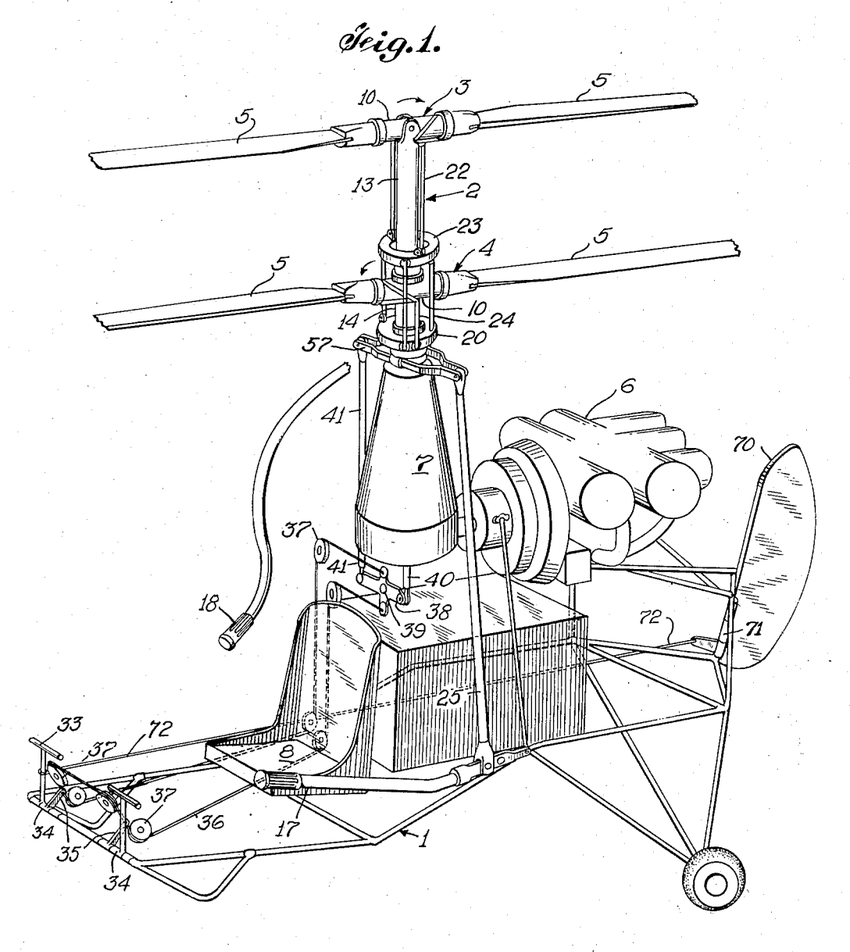
Fig. 1 is a partially schematic perspective view of a rotary wing aircraft having a directional control system in accordance with the invention.
Figures 2, 3:
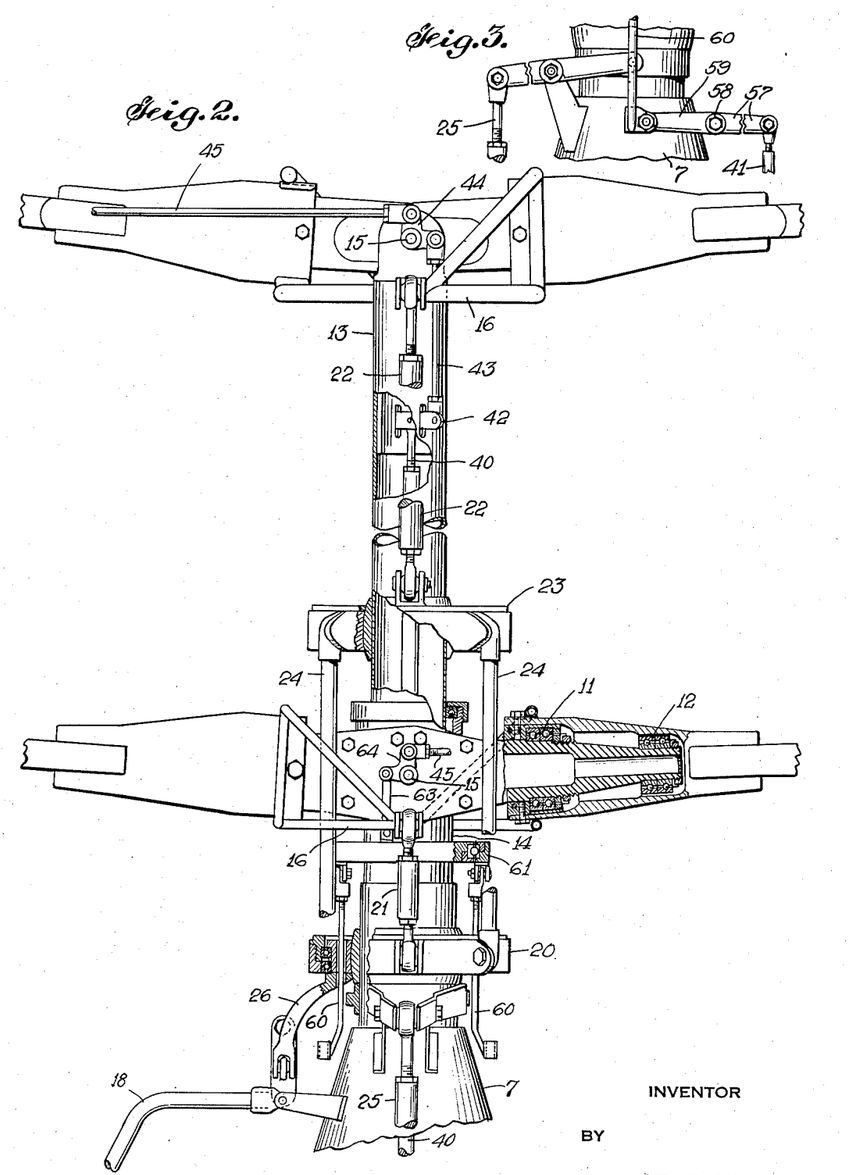
Fig. 2 is a left side elevation on a larger scale of the rotor head of the aircraft, certain parts being shown in section.
Fig. 3 is a partial rear elevation of the lower portion of the rotor head shown in Fig. 2.

The helicopter has suitable controls for varying and regulating the pitch of the rotor blades both cyclically and non-cyclically. As illustrated in Figs. 1 to 3, these controls comprise a collective pitch lever 17 and an overhead stick 18 that controls cyclical pitch and thereby provides azimuthal control of the helicopter. A swash plate 20 surrounds the rotor shafts and is mounted so that it can be tilted and also moved up and down. In accordance with known construction, the swash plate comprises a portion that rotates with the lower rotor shaft and a portion that does not rotate. The horns 16 of the lower rotor blades are connected to the rotating portion of the swash plate by linkage 21 while horns of the upper rotor blades are similarly connected to the rotating portion of the swash plate by linkage comprising rods 22, a bearing assembly 23 (to accommodate the opposite directions of rotation on the upper and lower rotors) and rods 24. The collective pitch lever 17 is connected to the swash plate 20 by linkage 25 to move the swash plate up and down and thereby vary the non-cyclical collective pitch of the rotors, for example for ascending or descending. The stick 18 is connected to the swash plate by linkage 26 (Fig. 2) so that movement of the free end of the stick in either a fore-and-aft or lateral direction correspondingly tilts the swash plate so that the pitch of the rotor blades is varied cyclically to provide azimuthal control. It will be understood that these controls are described by way of example and that other control arrangements may be employed.

The directional heading of the fuselage is controlled by means of spoilers 30 provided on the rotor blades 5 (Figs. 4 to 8). The spoilers are shown in the form of flaps which extend longitudinally of the blades and are hinged at 31 along their forward edges so as to swing from a closed or inactive position in which they conform to the airfoil contour of the blades, as shown in solid lines in Figs. 6 and 7, to an open or active position in which they project above the upper surfaces of the blades, as shown in dot-and-dash lines. The spoilers 30 are located in the inboard three-quarters of the blades, i. e. not more than 75% of the distance between the hub and the blade tips. Experience to date indicates that the spoilers should be located between 25% and 75% of the blade length from the hub, for example about halfway out. The size of the spoilers depends on their location on the blades and the torque required to provide the desired steering characteristics. For example, if a greater torque differential is required for steering, either because of the greater weight of the helicopter or a desire for greater maneuverability, correspondingly larger spoilers are used. The spoiler illustrated in Fig. 4 has a width that is approximately one-fourth the chord of the blade and is pivoted to swing about an axis located between one-fourth and one-half way back from the leading edge of the blade. The length of the spoiler is, for example, between 10% and 50% the length of the blade, being illustrated as about 20%. Good results have been obtained with a spoiler length between 15% and 30% of the blade length.

The positions of the spoilers are controlled by a direction-control member shown as coordinated rudder pedals 33 (Fig. 1) connected to the spoilers by suitable connecting means, for example by electrical, hydraulic or mechanical connections. The connections are such that, when the rudder pedals 33 are in normal centered position for straight-ahead flight, the spoilers of both rotors are inactive position. Forward movement of the right pedal causes the spoilers on one rotor to be moved toward active position while forward movement of the left pedal causes the spoilers on the other rotor to be moved toward active position. In powered flight, activation of the spoilers on a rotor causes an increase in the drag of that rotor. The drag of one rotor is hence greater than that of the other and the resulting torque differential causes the fuselage to turn in the direction of the larger torque. In autorotative flight, activation of the spoilers on a rotor causes a loss of lift such that the accelerating torque of that rotor is decreased. At the same time, the decelerating torque of the rotor is increased because of the increase in drag resulting from the spoilers. These two effects are additive and produce a positive control in the same direction as in powered flight. The activation of the spoilers in either instance is progressive, being dependent on the amount of pedal movement.

In the arrangement shown in Figs. 1, 2, 4, 7 and 8, the pedals 33 project respectively from coaxial sleeves 34 which are oscillatably supported on the frame 1 and have projecting arms 35 connected to a cable 36 that runs over a plurality of guiding pulleys 37 and has opposite ends connected to opposite arms of a cross-shaped lever 38 pivotally supported at 39. The pulley arrangement is such that forward movement of one pedal 33 moves the other pedal rearwardly and oscillates the lever 38 in one direction while forward movement of the other pedal moves the first pedal rearwardly and oscillates the lever 38 in the opposite direction. The other two arms of the lever 38 are connected respectively to a rod 40 that controls the spoilers of the upper rotor and a rod 41 that controls the spoilers of the lower rotor.

Figures 4, 5, 6, 7, 8:
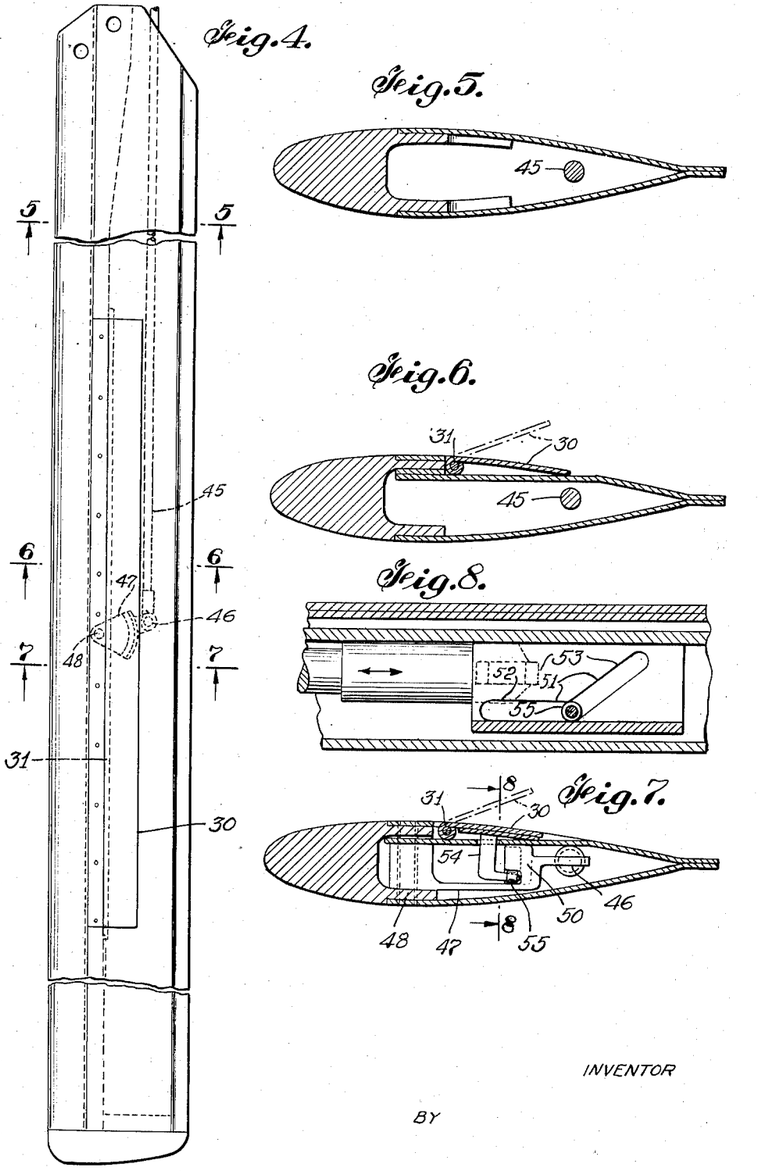
Fig. 4 is a plan of one of the rotor blades or wings.
Figs. 5, 6 and 7 are enlarged sections taken approximately on the lines 5—5, 6—6 and 7—7, respectively, in Fig. 4.
Fig. 8 is an enlarged section taken approximately on the line 8—8 in Fig. 7.

The upper rotor spoiler control rod 40 extends up through the transmission 7 and inside the inner rotor shaft 13. The upper end of rod 40 is connected to the middle of a cross-bar 42 (Fig. 2), a rotary coupling being provided in the rod 40 or its connections to accommodate rotation of the rotor. The opposite ends of the cross-bar 42 extend outwardly through diametrically opposite slots in the upper rotor shaft 13 and are connected by rods 43 to horizontal arms of bell cranks 44 that are pivotally mounted on opposite sides of the upper rotor hub on the hinge pin 15. The bell cranks 44 have approximately vertical arms connected respectively to push-pull rods 45 which extend out into the rotor blades. The outer end of each of the rods 45 is pivotally connected at 46 (Fig. 4) to a sector-shaped arm 47 which is pivotally mounted inside the wing at 48 about midway between the ends of the spoiler 30 so as to swing about an axis approximately perpendicular to the chord of the blade. The arm 47 carries an arcuate cam 50 that is coaxial with the pivot 48. On its inner face, the cam 50 has a cam groove or track 51 (Fig. 8) comprising an approximately horizontal lower portion 52 and an upwardly inclined portion 53. An L-shaped cam follower 54 projects downwardly from the inner face of the spoiler 30 and carries a roller 55 that is received in the cam groove 51 (Figs. 7 and 8). When the cam 50 is in centered position (Fig. 4), the roller 55 is in the lower portion of the cam groove 51 and the spoiler is held in closed position, as shown in solid lines in Fig. 7. When the cam 50 is moved toward the left from the centered position shown in Fig. 8, the upwardly inclined portion 53 of the cam track carries the roller 55 upwardly, progressively opening the spoiler 30. When the cam 50 is moved toward the right from centered position, the horizontal portion 52 of the cam track maintains the spoiler in closed position. It will be understood that, when a long spoiler is used, it may be desirable to have a plurality of cam followers and cams spaced along the spoiler, all of the cams being connected to the push-pull rod 45.

The lower rotor spoiler control rod 41 (Figs. 1 and 3) is connected to the outer end of a fork 57 which is pivoted at 58 on a fixed support and has opposite arms 59 that straddle the rotor shafts and are connected by links 60 to an outer non-rotating race member of a rotary connector 61 that surrounds the rotor shaft. An inner concentric member of the rotary connector 61 rotates with, and is vertically slidable on, the lower rotor shaft 14 and is connected at diametrically opposite points to the lower ends of links 63, the upper ends of which are connected to approximately horizontal arms of bell cranks 64 which are pivotally mounted at opposite sides of the hub 10 of the lower end on the hinge pin 15 and correspond to the bell cranks 44 of the upper rotor. The bell cranks 64 have approximately vertical arms connected to push-pull rods 45 that extend out into the lower rotor blades and are the same as the spoiler-controlling push-pull rods of the upper rotor blades. The cam means for operating the spoilers of the lower rotor blades is the same as that described above in connection with the upper rotor and illustrated in Figs. 4 to 8.

The connections from the rudder pedals 33 to the spoilers is such that, when the pedals are in centered position, all of the spoilers are closed. Movement of the pedals in one direction from centered position progressively opens the spoilers of one rotor while the spoilers of the other rotor remain closed. Movement of the pedals in the opposite direction from centered position progressively opens the spoilers of the other rotor while those of the first-mentioned rotor remain closed. The resulting difference in lift and drag of the two rotors produces a reactive torque differential that turns the fuselage of the helicopter to the desired heading.

To assist in directional control of the helicopter during forward flight, it is provided with an air rudder 70 (Fig. 1) swingably mounted on the rear of the fuselage at 71 and connected to the rudder pedals 33 by a push-pull linkage 72. The operation of the air rudder is thereby coordinated with the operation of the spoilers to achieve directional control, as described above.

Another embodiment of the invention is illustrated in Figs. 9 to 14. As the general configuration is the same as that of the embodiment shown in Figs. 1 to 8, portions of the helicopter have been omitted to simplify the drawings and description. It will be understood that the helicopter has a frame or fuselage, coaxial rotors and a power plant for driving the rotors in opposite directions. Each rotor has a plurality of rotor blades or wings, two bladed rotors being shown by way of example.

The upper rotor 73 and lower rotor 74 both have rotor blades 75 mounted on hubs 76 by means of bearings which permit the blades to turn about their longitudinal axes to vary the pitch of the blades. Each blade has a horn 77 by means of which its pitch is controlled. The hubs 76 are mounted respectively on upper and lower rotor shafts 78 and 79 by means of hinge pins 80 which permit limited seesaw rocking of the hubs on the shafts.

Figure 12:
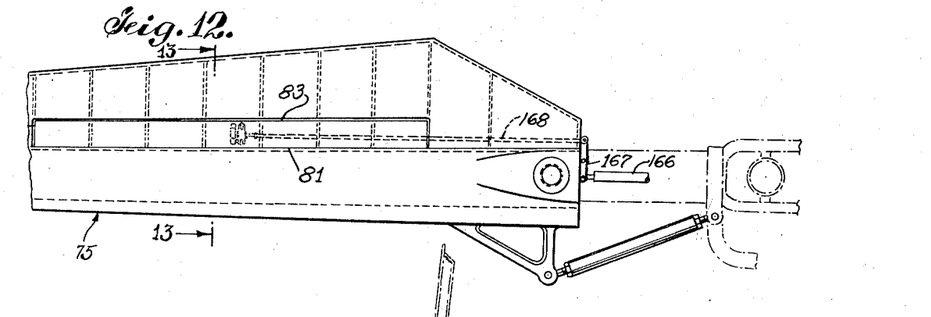
Fig. 12 is a partial plan view of one of the rotor blades or wings.
Figure 13:
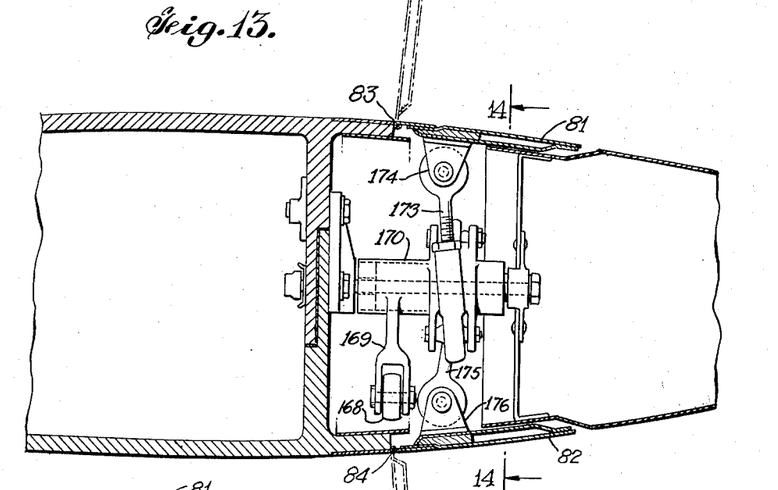
Fig. 13 is an enlarged fragmentary section taken approximately on the line 13—13 in Fig. 12.
Figure 14:
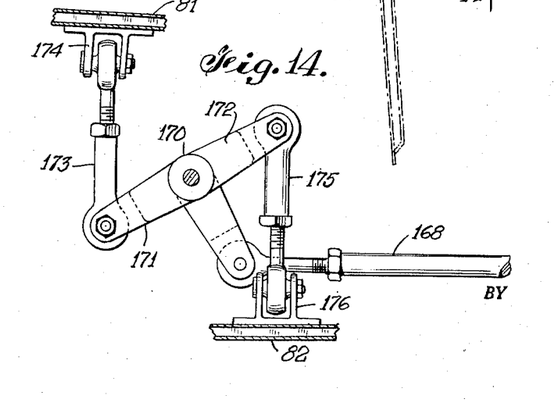
Fig. 14 is a section taken approximately on the line 14—14 in Fig. 13.

The rotor blades 75 are of an airfoil cross section and are provided with spoilers that are movable between an open or active position, in which they decrease the lift and increase the drag of the blades, and a closed or inactive position, in which they conform to, or lie within, the airfoil contour of the blades. As illustrated in Figs. 12 and 13, each blade has two spoilers 81 and 82 disposed on the top and bottom, respectively, of the blade and swingable about hinges 83 and 84 at their forward hinges between closed positions, as shown in solid lines in Fig. 13, and open positions, as shown in dot and dash lines. In closed position, the spoilers 81 and 82 conform to, and form a portion of, the upper and lower surfaces of the blade. In open position, they project out to alter the airfoil contour of the blade so as to decrease the lift and increase the drag. The spoilers are located in the inboard three-quarters of the blade and preferably have a length between 15 and 30% of the blade length. They are illustrated as being located approximately midway of the chord of the blade but they may, if desired, be moved forwardly or rearwardly from the position shown. The area of the spoilers is determined by the amount of torque differential required, as pointed out above.

In the embodiment illustrated in Figs. 9 to 14, directional control or steering of the helicopter is effected by a combination of spoilers and differential collective pitch of the rotors, i. e. varying the pitch of the rotor blades so that the pitch of the blades of one rotor increases while the pitch of the blades of the other rotor is decreased. This combined system has the advantage that during power-on flight, directional control is effected, at least primarily, by differential collective pitch so that the introduction of additional drag by the use of spoilers is avoided. During power-off or low power flight, when the steering torque provided by differential collective pitch decreases or reverses, steering is effected by the action of the spoilers. The transition from differential collective pitch control to spoiler control may be made dependent on engine torque or on rotor blade pitch since engine torque and rotor blade pitch are higher in power-on flight than in power-off flight. In the control system illustrated in Figs. 9 to 14 of the drawings, differential collective pitch and the spoilers are both controlled by rudder pedals in the manner that an initial increment of movement of the pedals from central position decreases the pitch of one rotor and increases the pitch of the other rotor to provide steering torque by differential collective pitch, the spoilers remaining inactive. A further increment of movement of the rudder pedals progressively opens the spoilers of one rotor while the spoilers of the other rotor remain closed to provide steering torque by means of the spoiler action. In power-on flight, a relatively slight rudder pedal movement is normally sufficient for steering and hence steering is effected by differential collective pitch control. In power-off flight, the pilot uses greater rudder pedal movement and thereby brings the spoilers into operation. Effective steering is thus provided under all operating conditions.

Provision is made for controlling the pitch of the rotor blades both cyclically and non-cyclically. The control system comprises an upper rotor swash plate 86 and a lower rotor swash plate 87. Each of the swash plates is mounted for axial movement and for limited universal tilting movement relative to the axis of the rotor shafts, for example by means of a slidable gimbal mounting and comprises relatively rotatable rings to accommodate the rotation of the rotors. Axial, i. e. vertical movement, of a swash plate varies the pitch of both or all blades of the respective rotor and thus provides collective pitch control. The tilting of a swash plate provides cyclical pitch control.

Figure 10A:
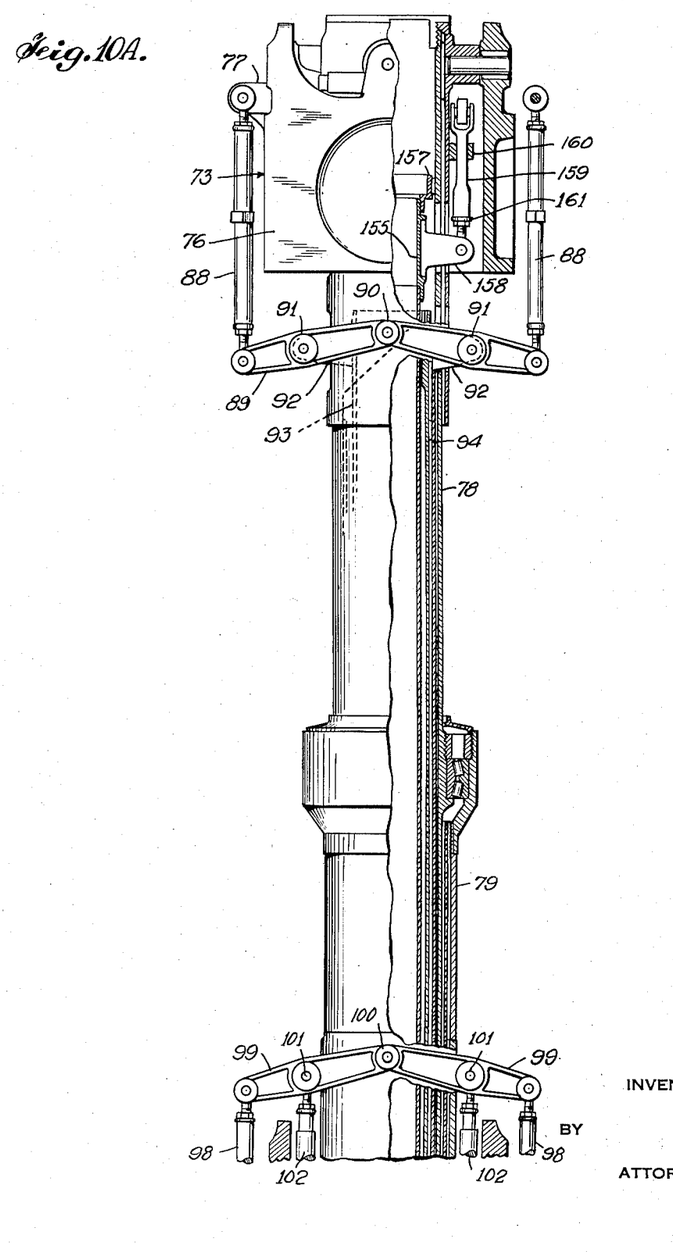
Figure 10B:
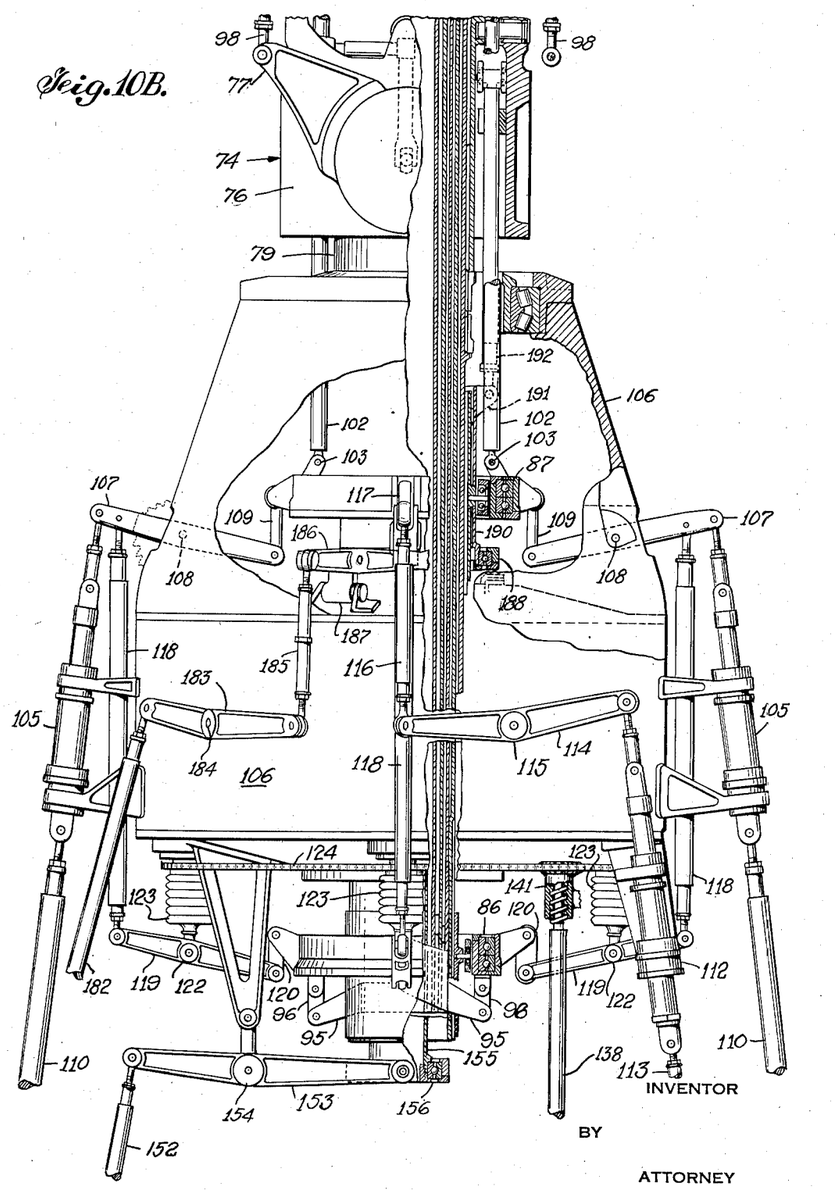
Fig. 10B is an elevation of the rotor head of the air-craft illustrated in Fig. 9, certain parts being shown in vertical section.
Figure 11:
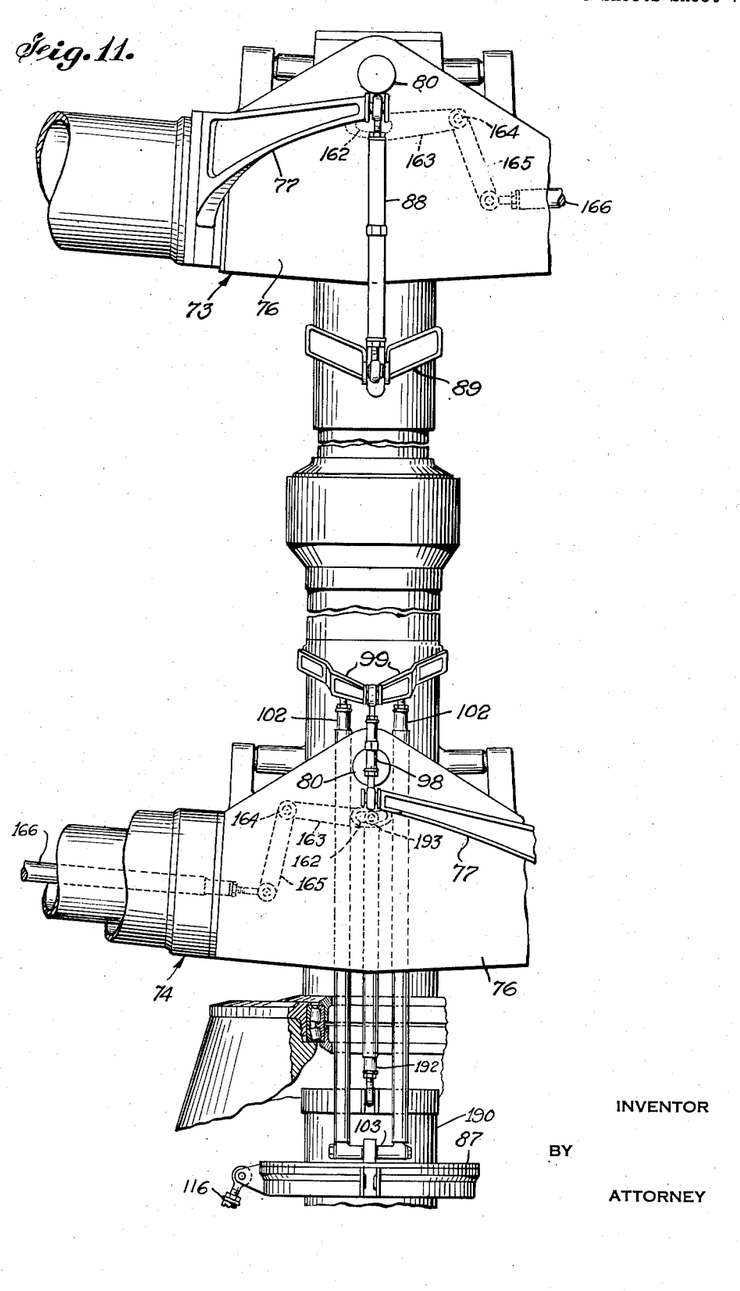
Fig. 11 is a side elevation at approximately right angles to Fig. 10.

The horn 77 of each of the upper rotor blades is connected by a link 88 with a forked lever 89, the opposite arms of which straddle and are pivotally mounted at 90 on the upper rotor shaft 78 (Figs. 10A and 11). Each lever 89 is pivotally connected at 91 to an arm 92 that projects radially out from a tubular shaft or sleeve inside the rotor shaft, one of said sleeves being designated 93 and the other 94. Slots are provided in the rotor shaft and in the outer sleeve 94 to accommodate the arms 92. At the lower ends of sleeves 93 and 94, there are provided arms 95 connected, respectively, by links 96 to diametrically opposite points on the upper rotor swash plate 86 (Fig. 10B). The sleeves 93 and 94 are axially movable independently of one another so that the pitch of each of the upper rotor blades is individually controlled from the swash plate 86. For example, when the upper rotor swash plate is tilted, the pitch of one blade may be momentarily increased while that of the other blade is decreased, the pitch of the blades being varied cyclically as the rotor turns. Axial movement of the swash plate 86 in an upward direction increases the pitch of both upper rotor blades collectively.

The horn 77 of each of the lower rotor blades is connected by a link 98 to a forked lever 99, the opposite arms of which straddle and are pivotally mounted at 100 on the lower rotor shaft 79 (Figs. 10A, 10B and 11). Each of the levers 99 is pivotally connected at 101 to the upper ends of a pair of links 102 the lower ends of which are pivotally connected at 103 to the lower swash plate 87, the points of connection to the swash plate being diametrically opposite to one another. Cyclical pitch control of the lower rotor blades is effected by tilting the swash plate 87 while collective pitch control of the lower rotor blades is effected by moving the swash plate 87 axially.

A suitable control system under control of a pilot, an automatic pilot, or both, is provided for tilting the swash plates and for moving them axially of the rotor shafts to control the rotor blade pitch cyclically and non-cyclically. As illustrated in Figs. 10B and 11, lateral hydraulic boosters 105 are mounted on a housing 106 and are connected to diametrically opposite sides of the lower rotor swash plate by levers 107 pivoted on the housing at 108 and links 109. The boosters 105 are controlled by lateral control rods 110. A longitudinal hydraulic booster 112, likewise mounted on the housing 106, is controlled by rod 113 and is connected to the lower rotor swash plate by a lever 114 pivoted on the housing at 115 and link 116. The point at which the link 116 is connected to the swash plate is spaced ninety degrees from the point at which the links 109 are connected. Thus, the boosters 105 control the lateral tilting of the swash plate 87 while the booster 112 controls the longitudinal tilting. Axial movement of the swash plate 87 is effected by the two boosters 105 and booster 112 acting together. The control rods 110 and 113 are connected with suitable pilot or automatic pilot controls which provide full control of the tilting and axial movement of the lower rotor swash plate. The lever 117 is similar to the levers 107 and is connected in a similar manner to the swash plate.

The upper rotor swash plate 86 is connected to the lower rotor swash plate 87 by three linkages each comprising an adjustable link 118, lever 119 and link 120 (Fig. 10B), the upper ends of the link 118 being pivotally connected, respectively, to the levers 107 and 117 and the link 120 being connected to corresponding angularly spaced points on the upper rotor swash plate. The levers 119 are pivotally supported at 122 by differential collective pitch screw jacks 123 all three of which are interconnected and thereby synchronously operated by a sprocket chain 124. The synchronous operation of the three screw jacks 123 varies the pitch of one rotor relative to that of the other and thereby provides directional control by means of differential collective pitch.

Figure 9:
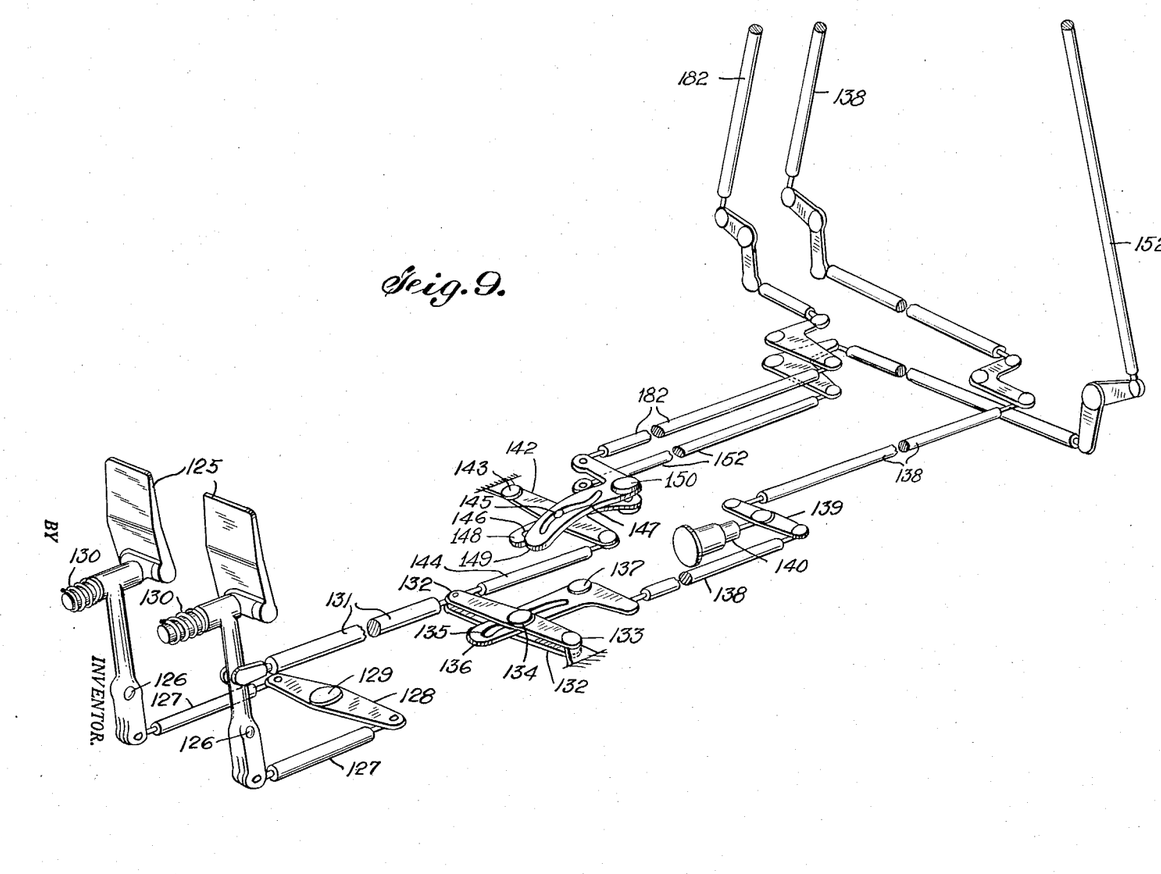
Fig. 9 is a schematic perspective view showing the directional controls of another embodiment of the invention.

A portion of a suitable pilot control system is shown schematically in Fig. 9, only those portions being shown that are concerned with directional control. Rudder pedals 124 pivotally supported on the frame at 126 are interconnected by links 127 and a lever 128 pivotally supported at 129. Adjustable springs 130 tend to hold the pedals 125 in centered position. One of the pedals is connected by a link 131 with one end of a lever 132 the opposite end of which is pivotally supported on the frame, as indicated at 133. The lever 132 comprises two spaced, parallel portions between which a pin 134 extends at a point intermediate the ends of the lever. The pin 134 extends through a cam slot 135 in one arm of a bellcrank lever 136 which is pivotally supported at 137. The other end of the bellcrank 136 is connected by suitable linkage 138 with the three differential collective pitch screw jacks 123 (Fig. 10B). The linkage includes a lever 139 the pivot of which is adjustable by means of a differential collective trim screw jack 140 and a device 141 (Fig. 10B) for converting push-pull movement of the linkage to rotary movement of a sprocket for driving the chain 124 by which the screw jacks 123 are operated. The shape of the cam slot 135 in bellcrank 136 is such that movement of the rudder pedals 125 in one direction from the centered position acts through the cam and the described linkage to increase the pitch of the upper rotor relative to that of the lower rotor while movement in the opposite direction decreases the pitch of the upper rotor relative to that of the lower rotor. The drag of the rotor having higher pitch is greater and provides a torque differential causing the fuselage to turn about an approximately vertical axis. End portions of the cam slot 135 are preferably concentric with the pivot 133 of the lever 132 so that, after a predetermined initial increment of movement of the pedals, further pedal movement does not cause further increase in differential collective pitch.

The spoilers 81 on the rotor blades are controlled by a lever 142 (Fig. 9) which is pivotally supported on the frame, as indicated at 143, and is connected by a link 144 with the lever 132 and hence through link 131 to the rudder pedals. The lever 142 carries a pin 145 which engages in cam slots 146 and 147 in the arms of two bell cranks 148 and 149 pivotally supported on the frame at 150. An arm of the bell crank 148 is connected by linkage 152 with one end of a lever 153 (Fig. 10B) which is pivotally supported at 154 and is connected at its other end with the lower end of a sleeve 155 that extends up inside the rotor shaft.

A connecting bearing 156 permits the sleeve 155 to rotate with the upper rotor shaft 78 and a bearing 157 (Fig. 10A) guides the upper end of the sleeve 155 while permitting axial movement of the sleeve. Two lugs or arms 158 are provided on the sleeve 155 near its upper end and project radially outwardly through slots provided in the upper rotor shaft, the lugs 158 being diametrically opposite one another. The outer end of each of these lugs 158 is connected to a vertically reciprocable plunger 159 guided by a bearing 160. The length of the plunger 159 is adjustable, as indicated at 161. The upper end of the plunger 159 is forked and carries a transverse pin which extends through a slot 162 in an arm 163 on a rock shaft 164. The slot 162 is concentric with the hinge pin 80 (Fig. 11) by which the rotor hub is connected to the rotor shaft, so that the rocking of the rotor hub on its hinge pin does not affect the operation of the arm 163 by the plunger 159. The rock shaft 164 carries a second arm 165 to the outer end of which a push-pull rod 166 is pivotally connected. The rod 166 extends out through the shank portion of the rotor blade and is connected by a pivoted lever 167 with a push-pull rod 168 extending out inside the blade (Fig. 12). At its outer end, the rod 168 is connected to an arm 169 on a rock shaft 170 (Figs. 13 and 14) which is oscillatably supported inside the rotor blade between the upper and lower spoilers 81 and 82. The rock shaft 170 has two other arms, 171 and 172, which are approximately opposite one another and at right angles to the arm 169. The arm 171 is connected by an adjustable link 173 to a forked bracket 174 on the inner face of the upper spoiler 81 while arm 172 is similarly connected by an adjustable link 175 to a bracket 176 on the inner face of the lower spoiler 82, suitable swivel connections being provided at the ends of the links 173 and 175. The arrangement of the arms on the rock shaft 170 is such that movement of the push-pull rod toward the left, as viewed in Fig. 14, causes upward movement of the link 73 and downward movement of the link 75 to open both spoilers simultaneously. Conversely, movement of the push-pull rod 168 toward the right moves both spoilers toward closed position. The arrangement and operation of the spoilers on the other blade of the rotor is the same, the spoilers on both blades of the upper rotor being thus controlled by axial movement of the sleeve 155 and hence, through the connections described, by the cam-slotted bell crank 148 (Fig. 9). The adjustability of the plungers 159 and links 173 and 175 provides suitable adjustment of the operation of the individual spoilers.

The lower rotor spoilers are controlled in a similar manner by the cam-slotted bell crank 149 (Fig. 9). An arm on the bell crank 149 is connected by linkage 182 to one end of a lever 183 pivotally supported at 184 (Fig. 10B). The other end of the lever 183 is connected by an adjustable link 185 to the outer end of a lever 186 that is pivotally supported on the transmission frame by a short pivot link 187. The inner end of lever 186 is forked and constitutes a yoke that is connected through a bearing 188 to the lower end of a sleeve 190 that rotates with the lower rotor shaft and is axially slidable. Near its upper end, the sleeve 190 is provided with diametrically opposite ears or lugs 191 to which the lower ends of upwardly extending plungers 192 are connected. The plungers 192 correspond to plungers 159 of the upper rotor and are similarly adjustable and guided for longitudinal movement. At the upper end of each of the plungers 192, there is provided a pin or roller 193 (Fig. 11) that works in a slot 162 of an arm 163 on a rock shaft 164 carry-blade, the construction being the same as described above for the upper rotor spoilers.

The shape of the cam slots 146 and 147 in the bell cranks 148 and 149 (Fig. 9) is such as to provide the desired operation of the spoilers upon manipulation of the rudder pedals 125 by the pilot. The central portion of each of the cam slots 146 and 147 is concentric with the pivot 143 of the swinging lever 142 so that a first increment of movement of the lever in either direction from a centered position does not move either of the bell cranks 148 or 149 from the normal position in which the spoilers are closed. Further movement of the lever 142 in one direction progressively opens the spoilers on one rotor while further movement in the opposite direction progressively opens the spoilers on the other rotor. When the spoilers on one rotor are opened, those of the other rotor are closed. The first increment of movement of the lever 142, during which the spoilers on both rotors are kept closed, corresponds, at least approximately, to the initial increment of movement of the pedals during which differential collective pitch is varied, as described above. Hence, an initial increment of movement of the rudder pedals in either direction from a centered "straight ahead" position controls the direction of the aircraft by differential collective pitch of the rotors, the spoilers on both rotors remaining closed. Further movement of the rudder pedals in either direction causes a progressive opening of the spoilers on one of the rotors while the spoilers on the other rotor remain closed.

While the mode of operation just described is considered preferable, it will be understood that the cam operation on the spoilers and of the differential pitch control makes it possible to coordinate the differential pitch control with the spoiler control in any desired manner. It will also be understood that, while two embodiments of the invention have been shown by way of example, various features of these embodiments are mutually interchangeable and other modifications may be made, as will be apparent to those skilled in the art.

What I claim and desire to secure by Letters Patent is:

1. In a rotary wing aircraft having a fuselage and two load-carrying rotors turning in opposite directions and having rotor blades of airfoil cross section, means for controlling the directional heading of the fuselage comprising spoilers on said rotor blades and movable between an active position in which they increase the drag of the respective rotors on which they are provided and an inactive position in which they do not materially increase said drag, said spoilers being located not less than 30% of the length of the blade from the tip of the blade, and pilot-controlled operating mechanism for moving said spoilers between active and inactive position, said operating mechanism including a movable pilot-controlled member and being connected to said spoilers to move said spoilers of one rotor to active position by movement of the pilot-controlled member in one direction and to move said spoilers of the other rotor to active position by movement of the pilot-controlled member in the opposite direction.

2. In a rotary wing aircraft, directional control means according to claim 1, in which the spoilers are located between 50% and 75% of the length of the rotor blade from the tip of the blade.

3. In a rotary wing aircraft having a fuselage and two load-carrying rotors turning in opposite directions and having rotor blades of airfoil cross section, means for controlling the directional heading of the fuselage comprising spoilers on said rotor blades and movable between an active position in which they project above the upper surface of said blades to increase the drag of the respective rotors on which they are provided and an inactive position in which they are disposed within the normal airfoil cross section of the blades, said spoilers being located not less than 30% of the length of the blade from the tip of the blade, a pilot-controlled steering member movable by the pilot in one direction from a normal position to turn the fuselage in one direction and movable in the opposite direction from said normal position to turn the fuselage in the opposite direction, and means interconnecting said steering member and said spoilers to move the spoilers on one rotor from inactive to active position when the steering member is moved in one direction while the spoilers on the other rotor are in inactive position and to move the spoilers on said other rotor from inactive to active position when the steering member is moved in the opposite direction while the spoilers on the first mentioned rotor are in inactive position.

4. In a rotary wing aircraft having a fuselage and two load-carrying rotors turning in opposite directions and having rotor blades of airfoil cross section, means for controlling the directional heading of the fuselage comprising spoilers on said rotor blades and movable between an active position in which they project below said blades to increase the drag of the respective rotors on which they are provided and an inactive position in which they are disposed within the normal airfoil cross section of the blades, said spoilers being located not less than 30% of the length of the blade from the tip of the blade, a pilot-controlled steering member movable by the pilot in one direction from a normal position to turn the fuselage in one direction and movable in the opposite direction from said normal position to turn the fuselage in the opposite direction, and means interconnecting said steering member and said spoilers to move the spoilers on one rotor from inactive to active position when the steering member is moved in one direction while the spoilers on the other rotor are in inactive position and to move the spoilers on said other rotor from inactive to active position when the steering member is moved in the opposite direction while the spoilers on the first mentioned rotor are in inactive position.

5. In a rotary wing aircraft having a fuselage and two load-carrying rotors turning in opposite directions and having rotor blades of airfoil cross section, means for controlling the directional heading of the fuselage comprising a pair of spoilers provided on each of said rotor blades and movable from an inactive position in which said spoilers are disposed in the airfoil cross section of the blade to an active position in which one spoiler of a pair projects upwardly and the other spoiler of said pair projects downwardly from the normal airfoil cross section of the blade, said spoilers being located not less than 30% of the length of the blade from the tip of the blade, a pilot-controlled steering member movable by the pilot in one direction from a normal position to turn the fuselage in one direction and movable in the opposite direction from said normal position to turn the fuselage in the opposite direction, and means interconnecting said steering member and said spoilers to move the spoilers on one rotor from inactive to active position when the steering member is moved in one direction while the spoilers on the other rotor are in inactive position and to move the spoilers on said other rotor from inactive to active position when the steering member is moved in the opposite direction while the spoilers on the first mentioned rotor are in inactive position.

6. In a rotary wing aircraft having a fuselage and two load-carrying rotors turning in opposite directions and having rotor blades of airfoil cross section, said rotors being mechanically interconnected to rotate at a constant speed ratio relative to one another, means for controlling the directional heading of the fuselage comprising spoilers on said rotor blades and movable between an active position in which they spoil the airfoil cross section of the blade to increase the drag of the respective rotors on which they are provided and an inactive position in which they are disposed within the normal airfoil cross section of the blades, a pilot-controlled steering member movable by the pilot in one direction from a normal position to turn the fuselage in one direction and movable in the opposite direction from said normal position to turn the fuselage in the opposite direction, and means interconnecting said steering member and said spoilers to move the spoilers on one rotor progressively from inactive to active position when the steering member is moved in one direction while the spoilers on the other rotor are maintained in inactive position and to move the spoilers on said other rotor progressively from inactive to active position when the steering member is moved in the opposite direction while the spoilers on the first mentioned rotor are maintained in inactive position.

7. In a rotary wing aircraft having a fuselage, two coaxial load-carrying rotors turning in opposite directions and having rotor blades of airfoil cross section and transmission means interconnecting said rotors to maintain a constant speed ratio between the rotors, means for controlling the directional heading of the fuselage comprising spoilers on said rotor blades, said spoilers being movable between an active position in which they increase the drag of the respective rotors and an inactive position in which they are disposed substantially within the airfoil cross section of the blades, and operating mechanism for moving the spoilers on one rotor progressively from inactive to active position while maintaining the spoilers on the other rotor in inactive position and for moving the spoilers on said other rotor progressively from inactive to active position while maintaining the spoilers on the first mentioned rotor in inactive position.

8. In a rotary wing aircraft having a fuselage, two load-carrying rotors turning in opposite directions and having rotor blades of airfoil cross section, transmission means interconnecting said rotors to drive them at a constant speed ratio and means for changing the pitch of the rotor blades, means for controlling the directional heading of the fuselage comprising spoilers on said rotor blades, said spoilers being movable between an active position in which they increase the drag of the respective rotors and an inactive position in which they are disposed substantially within the airfoil cross section of the blades, a pilot-controlled steering member movable by the pilot in one direction from a normal position to turn the fuselage in one direction and movable in the opposite direction from said normal position to turn the fuselage in the opposite direction, and means interconnecting said steering member, spoilers and pitch-changing means in the manner that movement of the steering member in one direction from normal position increases the pitch of the blades of one rotor relative to the pitch of the blades of the other rotor and moves the spoilers on the first mentioned rotor from inactive to active position and movement of the steering member in the opposite direction from normal position increases the pitch of the blades of said other rotor relative to the pitch of the blades of the first mentioned rotor and moves the spoilers on said other rotor from inactive to active position.

9. In a rotary wing aircraft having a fuselage, two load-carrying rotors turning in opposite directions and having rotor blades of airfoil cross section, a power plant and transmission means connecting said power plant with said rotors to drive the rotors at a constant speed ratio relative to one another, means for controlling the directional heading of the fuselage comprising spoilers on said rotor blades, said spoilers being movable between an active position in which they increase the drag of the respective rotors and an inactive position in which they are disposed substantially within the airfoil cross section of the blades, a pilot-controlled steering member movable by the pilot in one direction from a normal position to turn the fuselage in one direction and movable in the opposite direction from said normal position to turn the fuselage in the opposite direction, means interconnecting said steering member and pitch-changing means to increase the pitch of the blades of one rotor relative to the pitch of the blades of the other rotor when the steering member is moved in one direction from normal position and to increase the pitch of the blades of said other rotor relative to the pitch of the blades of the first mentioned rotor when the steering member is moved in the opposite direction, and means interconnecting said steering member with the spoilers to move the spoilers of the first mentioned rotor from inactive to active position when the steering member is moved in the first mentioned direction from normal position, the spoilers of said other rotor remaining in inactive position during such movement, and to move the spoilers of said other rotor from inactive to active position when the steering member is moved in said opposite direction from normal position, the spoilers of the first mentioned rotor remaining in inactive position during movement of the steering member in said opposite direction from normal position.

10. In a rotary wing aircraft having a fuselage, two load-carrying rotors turning in opposite directions and having rotor blades of airfoil cross section, a power plant and transmission means connecting said power plant with said rotors to drive the rotors at a constant speed ratio relative to one another, means for controlling the directional heading of the fuselage comprising spoilers on said rotor blades, said spoilers being movable between an active position in which they increase the drag of the respective rotors and an inactive position in which they are disposed substantially within the airfoil cross section of the blades, a pilot-controlled steering member movable by the pilot in one direction from a normal position to turn the fuselage in one direction and movable in the opposite direction from said normal position to turn the fuselage in the opposite direction, means interconnecting said steering member and pitch-changing means to increase the pitch of the blades of one rotor relative to the pitch of the blades of the other rotor by a first increment of movement of the steering member from normal position in one direction and means interconnecting the steering member with the spoilers to move the spoilers of the first mentioned rotor progressively from inactive to active position by a second increment of movement of the steering member from normal position in said direction.

References Cited in the file of this patent

UNITED STATES PATENTS

| | | |
|---|---|---|
| 1,023,233 | Williams | Apr. 16, 1912 |
| 2,456,485 | Bendix | Dec. 14, 1948 |